United States Patent
Lehmkuhl et al.

(10) Patent No.: US 9,823,105 B2
(45) Date of Patent: Nov. 21, 2017

(54) CIRCUIT ARRANGEMENT FOR MONITORING TEMPERATURE AND CALORIMETRIC MASS FLOWMETER

(71) Applicant: KROHNE Messtechnik GmbH, Duisburg (DE)

(72) Inventors: Jürgen Lehmkuhl, Dinslaken (DE); Jörg Kube, Marl (DE)

(73) Assignee: KROHNE Messtechnik GmbH, Duisburg (DE)

( * ) Notice: Subject to any disclaimer, the term of this patent is extended or adjusted under 35 U.S.C. 154(b) by 228 days.

(21) Appl. No.: 14/576,318

(22) Filed: Dec. 19, 2014

(65) Prior Publication Data

US 2015/0177040 A1 Jun. 25, 2015

(30) Foreign Application Priority Data

Dec. 19, 2013 (DE) .................. 10 2013 021 305

(51) Int. Cl.
| | |
|---|---|
| *G01F 1/69* | (2006.01) |
| *G01F 1/688* | (2006.01) |
| *G01F 1/698* | (2006.01) |
| *G01K 7/20* | (2006.01) |
| *G01F 1/696* | (2006.01) |
| *G01K 7/24* | (2006.01) |

(52) U.S. Cl.
CPC .............. *G01F 1/69* (2013.01); *G01F 1/6888* (2013.01); *G01F 1/696* (2013.01); *G01F 1/698* (2013.01); *G01K 7/20* (2013.01); *G01K 7/24* (2013.01)

(58) Field of Classification Search
CPC .......... G01F 1/69; G01F 1/6888; G01F 1/696; G01F 1/698; G01K 7/20; G01K 7/24
See application file for complete search history.

(56) References Cited

U.S. PATENT DOCUMENTS

| | | |
|---|---|---|
| 3,900,819 A | 8/1975 | Djorup |
| 4,182,183 A * | 1/1980 | Funk .................. G05D 23/2401 |
| | | 219/499 |
| 6,763,711 B1 | 7/2004 | Nair et al. |
| 7,162,374 B2 | 1/2007 | Burkhardt |
| 8,544,352 B2 | 10/2013 | Glatzel et al. |

(Continued)

FOREIGN PATENT DOCUMENTS

| | | |
|---|---|---|
| DE | 2 403 908 A1 | 8/1974 |
| DE | 102 51 891 A1 | 4/2004 |
| DE | 10 2009 029 171 A1 | 3/2011 |

(Continued)

*Primary Examiner* — Paul West
(74) *Attorney, Agent, or Firm* — David S. Safran

(57) ABSTRACT

A circuit arrangement (1) for monitoring the temperature of an electronic component (2), which, in particular, can be impinged with an electric current and can be connected to at least one voltage source (3). The circuit arrangement is able to guarantee safe monitoring of the temperature of an electronic component impinged with electric current by the electronic component (2) being part of at least one Wheatstone bridge (7) and by at least one switching device (8) being provided that influences the impingement of the electronic component (2) with electric current on the basis of a bridge transverse voltage of the Wheatstone bridge (7). Additionally, circuit arrangement (1) is well suited for use in a calorimetric mass flowmeter (18).

14 Claims, 2 Drawing Sheets

(56) References Cited

U.S. PATENT DOCUMENTS

2003/0132810 A1* 7/2003 Moindron ............ H02M 3/155
                                                          331/117 R
2006/0249532 A1* 11/2006 Bourget ................. B05C 5/001
                                                          222/54

FOREIGN PATENT DOCUMENTS

EP          0 212 076 A2    3/1987
EP          0 347 218 A2    12/1989

* cited by examiner

CIRCUIT ARRANGEMENT FOR MONITORING TEMPERATURE AND CALORIMETRIC MASS FLOWMETER

BACKGROUND OF THE INVENTION

Field of the Invention

The invention relates to a circuit arrangement for monitoring temperature of at least one electronic component, which can be impinged with electric current and can be connected to at least one voltage source. Furthermore, the invention relates to a calorimetric mass flowmeter having at least one electronic component, which, in particular, can be impinged with electric current and can be connected to at least one voltage source.

Description of Related Art

In modern process automation, measuring devices or actuators are also used in areas at risk of explosion. This makes it necessary, in particular, that certain voltage, current or temperature values are not exceeded by the components used.

Thus, for example, the electric sensor systems for use in areas at risk for explosion are designed in the ignition protection category "intrinsic safety". Hereby, intrinsic safety means that it is ensured that even in the case of malfunction, an unsafe situation will not arise, and in particular, there is no risk of explosion. Certain design requirements exist that are dictated, in part, by standards.

Voltages and currents occurring in the intrinsically safe electric systems are thus limited to safe maximum values in order to eliminate the risk of explosion due to spark ignition. Based on these values, a maximum value for power dissipation can be assumed in an intrinsically safe electric system.

Additionally, it also applies that the surface temperature of the electronic components arranged in the area at risk of explosion is limited in order to counter the risk of explosion due to hot surfaces. This can also occur by limiting power dissipation, for which the thermal resistance of the affected component is to be used.

So-called temperature classes, each having a maximum allowable temperature value, are given for explosion control. For example, the surface temperature may reach a maximum of 135° C. in the temperature class T4 classification.

Due to a relatively high thermal resistance in some components—such as the heating element of calorimetric mass flowmeters—the temperature limitation leads to the power dissipation being limited to a relatively small value.

Different arrangements for calorimetric or thermal flow measurement are known from the prior art. This type of determination of the flow of fluids—e.g., liquids or gases—in piping systems is suitable, in particular, for the measurement of low flow velocities. Thereby, the signal obtained from measurement is directly proportional to the mass flow. German Patent Application DE 10 2010 015 813 A1 and corresponding U.S. Pat. No. 8,544,352 B2 are referred to as an example of the prior art.

An essential measuring variable is the heat flux, which is given off from the heated element—electronic component—to the flowing fluid and taken away by the fluid. The heat flux taken away corresponds to the electric heat output.

In practice, two methods are generally discerned:

In the so-called cooling method, the flowing fluid cools the heating element that is inserted in the flow cross-section of the measuring tube and the temperature of the heating element is kept constant. The required heat output for generating the constant temperature difference is used for determining the mass flow.

In the so-called heating method, it is determined at which measure the heat flux taken away from the heating element increases the temperature of the medium at a second, downstream sensor. Alternatively, the increase in temperature can be kept constant by readjusting the heat output, so that then the required heat output is used as measuring variable for the mass flow.

Thus, the measuring principle requires a heating component.

In the case that no fluid is present or that the flow is too small, it is, in particular, necessary that it be ensured that the heating element, which is also called a heater, does not become heated over an allowed temperature value.

SUMMARY OF THE INVENTION

Thus, a primary object of the present invention is to provide a circuit arrangement—in particular, for use in a calorimetric flowmeter—, which guarantees a safe monitoring of the temperature of an electronic component impinged with electric current.

The circuit arrangement according to the invention, in which the above derived and described object is achieved, is initially and essentially wherein the electronic component is part of at least one Wheatstone bridge and that at least one switching device is provided that influences the impingement of the electronic component with electric current on the basis of a bridge transverse voltage of the Wheatstone bridge.

In the circuit arrangement according to the invention, information about the temperature of the heating component given via the resistance value of the electronic component is used for safe shutdown of the power supply, and thus, also for prevention of further heating.

In general, the circuit arrangement relates, in particular, to the intrinsically safe supply from sensor electric circuits having a high energy requirement at a high thermal resistance of the used elements or components.

Wheatstone bridges of the prior art consist, in most cases, of four resistances that interconnect in a closed ring or a square. Thereby, one voltage source is arranged in one diagonal and a voltage-measuring device is arranged in the other diagonal. The bridge transverse voltage is measured with the voltage-measuring device in the prior art.

The use of Wheatstone bridges in thermal mass flowmeters is, for example, known from German Patent Applications DE 2 403 908 which corresponds to U.S. Pat. No. 3,900,819, DE 102 51 891 B4 which corresponds to U.S. Pat. No. 7,162,374, or DE 10 2009 029 171 A1. However, the bridges there are used for measuring the resistance value of the heating element.

A Wheatstone bridge is used for the measurement of a resistance value or the setting of a variable resistance element in the prior art.

In the invention, a Wheatstone bridge is used for shutting down a power supply in order to prevent further heating. Temperature monitoring according to the invention is thus also a form of temperature limitation.

In one design, the switching device is comprised at least in part of controllable semiconductor devices.

In one design, the switching device has at least one switch that is independent of the bridge transverse voltage, and thus, independent of the thermal resistance value of the electronic component, which enables or disconnects the electric connection between the electronic component and the voltage source.

In one design, in respect to the reaction to achieving a predetermined resistance or temperature value, it is provided that the switching device influences the electric connection between the voltage source and the electronic component on the basis of the bridge transverse voltage. Voltage supply of the electronic components is shut off here, in that, for example, a short circuit of the voltage supply is created. Any other reversible or possibly irreversible interruption of the voltage supply also lies within the scope of the invention.

It is provided in one design that the electronic component has a temperature-dependent electric resistance value.

It is fundamentally necessary that the interrelation between temperature and thermal resistance value of the electronic component be known, so that the other three resistance elements of the Wheatstone bridge can be dimensioned correspondingly and in coordination with the limiting temperature value of the electronic component.

If, in particular, a resistance element is switched in series between the electronic component and the voltage source, this is additionally used, in one design, for current limitation in order to prevent spark ignition.

A particular design is comprised of the electronic component having at least one temperature-dependent electric resistance element.

The switching device, in one design, has at least one comparator and a switch. The comparator thereby influences the switch, and the switch, in one switching state, interrupts a connection between the voltage source and the electronic component.

Thus, the comparator can open or close the connection between the voltage source and the electronic component via the switch, so that, in particular, the exceeding of a predetermined temperature value can be prevented by the electronic component in that the flow of current is interrupted.

The interruption of the connection is, in one design, implemented in that the voltage source is short circuited before the electronic component, so that no current flows downstream over the electronic component.

In one design, the switch is arranged between the voltage source and a ground potential, which leads to a short circuit of the voltage source in countercurrent with ground when switched and no current flowing over the electronic component. The switch is thus preferably placed before the electronic component in respect to the voltage source.

Specifically, in one design, the switch is, in particular, a thyristor, which is controlled by the comparator.

A thyristor is a semiconductor device formed of four or more semiconductor layers of alternating doping. Thyristors are so-called switchable components, which are nonconductive in the original position and can be switched on by a small current at the gate electrode. Then, the thyristor remains conductive without gate current and is shut off again when the current falls below a minimum current, the so-called holding current.

In this design, a thyristor is switched when the thermal resistance value of the electronic component has reached a threshold value.

In one design, the switching device or, in one design, especially the switch or thyristor is also used for limiting the maximum occurring electric voltage.

In an intrinsically safe auxiliary power supply having high power, a fast shutdown of the circuit arrangement occurs in one design in order to reliably limit the spark duration in the case of a short circuit.

The monitoring of the resistance value of the electronic component occurs, in one design, in that the bridge transverse voltage of the Wheatstone bridge is present at to two inlets of the comparator.

In order for the electronic component to be seen as a component that is not susceptible to interference, it may only be used to a capacity of $2/3$. The type of construction is also specified. A wire-wound resistor with protection against unwinding of the wire in case of breakage can, for example, be used as a component that is not susceptible to interference. Preferably, the resistance element switched in series with the electronic component is designed as a resistor that is not susceptible to interference.

In order to increase the reliability of the circuit arrangement, is it provided in one design, that the electronic component is a part of at least one Wheatstone bridge and that at least one redundant switching device is provided that influences the impingement of the electronic component with electric current on the basis of a bridge transverse voltage of the redundant Wheatstone bridge.

The above derived and described object is achieved according to a further teaching of the invention with the calorimetric mass flowmeter mentioned in the introduction in that the electronic component is a part of at least one circuit arrangement according to one of the above designs.

The above designs and implementations in respect to the switching device are thus correspondingly also valid for use in a calorimetric mass flowmeter. Thereby, the electronic component is, in particular, the heating element of the measuring device.

The circuit arrangement according to the invention can be explained again on the basis of the calorimetric mass flowmeter.

The measuring device has a heating element, which has a temperature-dependent electric resistor. Owning to the use, a maximum temperature for the heating element as electronic component of the circuit arrangement is predefined. This limiting temperature is assigned to a resistance value as limiting resistance value.

The three resistance elements of the Wheatstone bridge are designed based on the limiting resistance, so that the comparator switches the switching device when the limiting resistance is reached, so that the connection between the heating element and the voltage source is interrupted.

By interrupting the power supply, further heating is stopped and the limiting temperature cannot be exceeded.

This ensures that the electronic component does not become too hot and that there is no explosion due to electronic component.

To limit the current, in one design, a resistance element which is preferably also part of the Wheatstone bridge is switched upstream from the electronic component.

The switch of the switch device is used in an additional or alternative design for voltage limiting.

In detail, there are a number of possibilities for designing and further developing the circuit arrangement according to the invention and the calorimetric mass flowmeter according to the invention as will be apparent from the following description of embodiments in conjunction with the accompanying drawings.

DETAILED DESCRIPTION OF THE INVENTION

Figure 1:
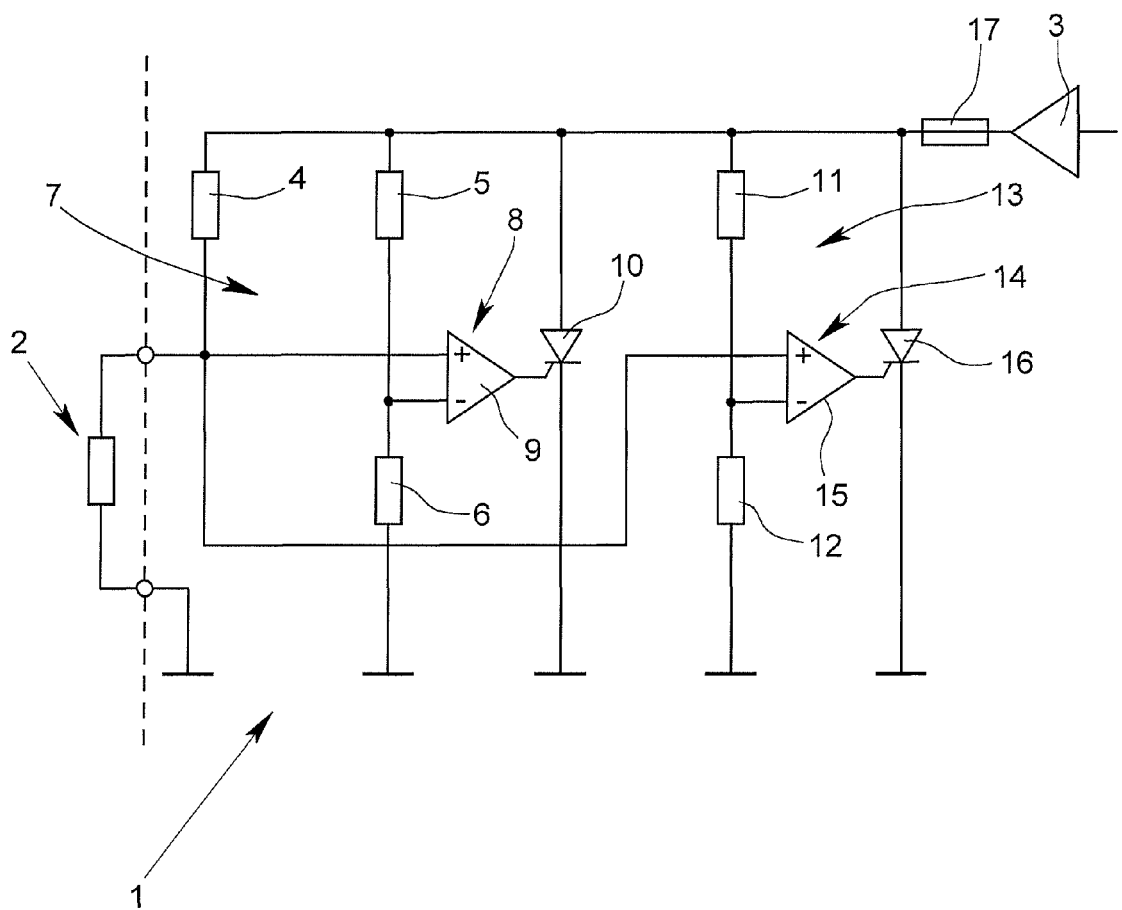
FIG. 1 is a schematic representation of the circuit arrangement as block diagram and FIG. 2 is a schematic flowmeter in cross-section.

A circuit arrangement 1 is schematically represented in FIG. 1, in which the temperature of an electronic component 2 is monitored and in which it is ensured that a certain specified temperature value is not exceeded.

When used in areas at risk of explosion, it is partially necessary to make sure that temperatures are not reached in a component that could lead to a medium igniting in the corresponding area.

Such an increase in temperature could arise in the illustrated arrangement in that the electronic component 2, which is considered in the following to be an electric resistance element, heats up after impingement with electric current from a voltage source 3.

The electronic component 2 is thus at least temporarily electrically connected to the voltage source 3 and is at least temporarily impinged with an electric current from the voltage source 3. The circuit arrangement 1 is used thereby for the purpose of interrupting the power supply in the case that the electronic component 2 reaches a temperature that is too high, in order to prevent further heating.

Here, only one resistance element is shown as electronic component 2. In alternative designs (not shown here), several members or units or components are provided as electronic component 2 and are suitably connected to one another.

The separation between the zone that is at risk of explosion and that, which is safe, is indicated here with a dashed line and both contacts for the electronic component 2 are indicated.

Monitoring the temperature or also ensuring that the temperature does not become too high is implemented here in that the electronic component 2 forms a Wheatstone bridge 7 with three electric resistance elements 4, 5, and 6.

The electronic component 2 and a resistance element 4 are switched in series between the voltage source 3 and ground, for this. The two other resistance elements 5, 6 switched in series are provided parallel thereto, they are also connected to the voltage source 3 and the ground potential.

The resistance elements 4, 5 and 6 are indicated here, as an example, as discrete resistance components.

The resistance element 4 switched in series with the electronic component 1 is also used here for limiting the electric current that flows through the electronic component 1. Thus, the resistance value of this resistance element 4 is also to be chosen in compliance with the protection conditions.

In an unillustrated alternative embodiment, at least one resistance element 4, 5, or 6 is formed of several members or components, which can be described overall by the characteristic of the electric resistance in respect to the circuit arrangement 1 according to the invention.

A switching device 8 is provided for monitoring the bridge transverse voltage of the Wheatstone bridge 7, which is formed here of a comparator 9 and a switch 10. The switch 10 lies parallel to the Wheatstone bridge 7 and is—in respect to the voltage source 3—upstream from the Wheatstone bridge 7.

The switch 10 in the illustrated embodiment comprises a thyristor, which is controlled by the output of the comparator 9 and which opens and closes the electric connection between the voltage source 3 and—here as an example—ground.

Depending on the switched state of the switch 10, thus, the electronic component 2 is either impinged with electric current or the electric connection between the electronic component 2 and the voltage source is interrupted.

The connections between the Wheatstone bridge 7 and the comparator 9, the comparator being implemented here by an operation amplifier, are such that the bridge transverse voltage is present at the inputs of the comparator 9.

In order to increase the reliability of the circuit arrangement 1, the electronic component 2 and the resistance element 4 switched in series with it and two resistance elements 11, 12 parallel thereto and switched in series with one another form a redundant Wheatstone bridge 13, whose bridge transverse voltage is monitored by a redundant switching device 14.

The redundant switching device 14 is designed the same as the switching device 8 in the illustrated embodiment and thus has a comparator 15 and a thyristor as switch 16, which is arranged between the voltage source 3 and ground.

The redundant Wheatstone bridge 13 and the redundancy switching device 14 function principally the same as the Wheatstone bridge 7 and the switching device 8. A certain threshold resistance value of the electronic component 2 also contributes, here, to the power supply being interrupted.

Another fuse 17 is switched upstream in the direction of the electronic component 2 from the voltage source 3 in the shown design.

The circuit arrangement 1 according to the invention of the illustrated embodiment functions overall as follows:

The electronic component 2, which, as an example, is located in a zone at risk of explosion, is impinged with electric current by a voltage source 3, which, here, in particular, is arranged in a zone that is not at risk of explosion.

For this, the electronic component 2 is arranged between the voltage source 3 and ground in the illustrated embodiment.

A Wheatstone bridge 7 is formed by an electric resistance element 4 switched in series with the electronic component 2 and two resistance elements 5, 6 arranged in series with one another and parallel to the electronic component 2.

Thereby, the resistance value of the electronic component 2 is dependent on the temperature of the component 2.

The bridge transverse voltage of the Wheatstone bridge 7 is monitored by a switching device 8.

The resistance elements 4, 5, and 6 are thereby set or chosen so that the switching device 8 interrupts the power supply when a predetermined resistance value of the electronic component 2 is reached, in that it separates the contact between the voltage source 3 and the electronic component 2 with a switch 10.

Thus, if the electronic component 2 reaches a predetermined temperature, then it has an already-known electric resistance value.

The Wheatstone bridge 7 allows the resistance value to be reached or to acknowledge this temperature and to react suitably to it.

If this state is present, the power supply to the electronic component 2 is interrupted and the electronic component 2 can no longer heat up.

If the electronic component 2 has sufficiently cooled down in the illustrated embodiment, then the Wheatstone bridge 7 is sufficiently tuned again and the power supply to the electronic component 2 is reinstated.

Alternatively—not shown here—the return to the impinged state can be prevented by using appropriate designs or components.

In the embodiment shown, one half of the Wheatstone bridge 7 and the switching device 8 are redundantly designed and arranged before the Wheatstone bridge 7 in respect to the voltage source 3.

Thus, the electronic component 2 also forms a part of the redundant Wheatstone bridge 13, whose bridge transverse voltage influences the switch 16 of the redundancy switching device 14.

Closing the electric connection into an electric circuit is implemented in the illustrated embodiment partially via contact of a ground potential.

Thereby, the switching device is generally suitable for monitoring temperature of an electronic component 2 impinged with current, which can be characterized by its electric resistance. This can be relevant, in particular, in use in zones at risk of explosion, in which the exceeding of a certain temperature value is to be prevented.

Figure 2:
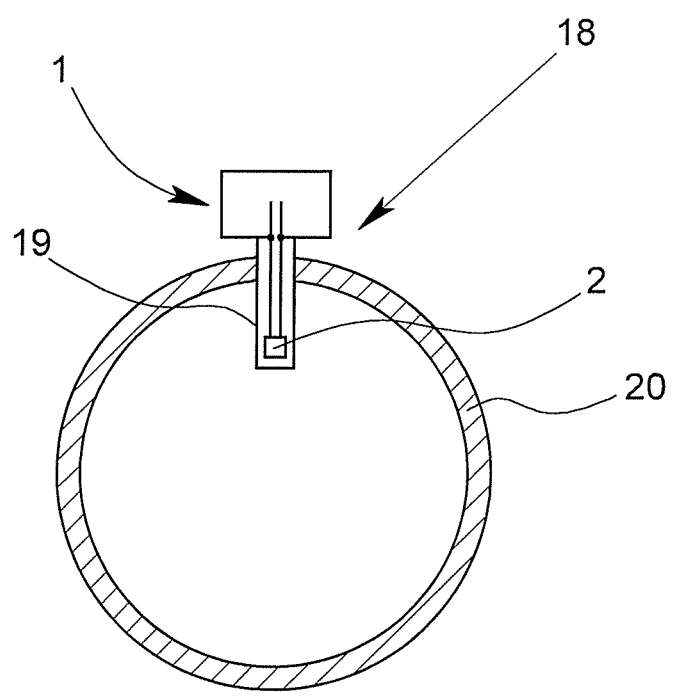

A particular use of the circuit arrangement 1 is shown as an example in FIG. 2.

FIG. 2 shows a cross-section through a schematically depicted calorimetric mass flowmeter 18.

For this, the electronic component 2, as is shown in FIG. 1, is arranged in a protective tube 19 on the inside of a measuring tube with medium 20 flowing through it—not shown.

For measurement, the electronic component 2, which is, in particular, at least one resistance element here, is impinged with electric current, which leads to a heating of the component 2.

This thermal energy is taken away by the flowing medium, which locally heats up.

This change in temperature can be registered by a temperature sensor—not shown here—arranged downstream in the direction of flow from the electronic component 2.

Finally, the mass flow of the medium can be determined using the output of the thermal component 2, the detected change in temperature, and, preferably, also data about the measuring medium.

A problem arises when there is no medium flow or when the flow of the medium is so small, that the electronic component 2 heats up too much due to a lack of heat removal.

The circuit device 1, which interrupts the power supply to the electronic component 2 when a given temperature value is exceeded and which prevents further heating, is provided here for this situation.

What is claimed is:

1. Circuit arrangement for monitoring the temperature of an electronic component which can be impinged with an electric current and which can be connected to at least one voltage source, comprising
   wherein the electronic component is part of at least one Wheatstone bridge and
   wherein at least one switching device is provided that influences the impingement of the electronic component with electric current based on a bridge transverse voltage of the Wheatstone bridge,
   wherein the electronic component is part of at least one redundant Wheatstone bridge and
   wherein at least one redundant switching device is provided that influences the impingement of the electronic component with electric current on the basis of a bridge transverse voltage of the redundant Wheatstone bridge.

2. Circuit arrangement according to claim 1, wherein the switching device influences an electrical connection between the voltage source and the electronic component on the basis of the bridge transverse voltage.

3. Circuit arrangement according to claim 1, wherein the electronic component has a temperature-dependent electric resistance value.

4. Circuit arrangement according to claim 3, wherein the electronic component has at least one temperature-dependent electric resistance value.

5. Circuit arrangement according to claim 1, wherein the switching device has at least one comparator and a switch, wherein the at least one comparator influences the switch, and wherein, in a switched state, the switch disconnects a connection between the voltage source and the electronic component.

6. Circuit arrangement according to claim 5, wherein the switch is a thyristor.

7. Circuit arrangement according to claim 5, wherein the bridge transverse voltage of the Wheatstone bridge is present at two inputs of the at least one comparator.

8. Calorimetric mass flowmeter having at least one electronic component which can be impinged with an electric current and which can be connected to at least one voltage source,
   wherein the electronic component is part of at least one Wheatstone bridge of a circuit arrangement,
   wherein at least one switching device is provided that influences the impingement of the electronic component with electric current based on a bridge transverse voltage of the Wheatstone bridge,
   wherein the electronic component is part of at least one redundant Wheatstone bridge and
   wherein at least one redundant switching device is provided that influences the impingement of the electronic component with electric current on the basis of a bridge transverse voltage of the redundant Wheatstone bridge.

9. Calorimetric mass flowmeter according to claim 8, wherein the switching device influences an electrical connection between the voltage source and the electronic component on the basis of the bridge transverse voltage.

10. Circuit arrangement according to claim 8, wherein the electronic component has a temperature-dependent electric resistance value.

11. Circuit arrangement according to claim 10, wherein the electronic component has at least one temperature-dependent electric resistance value.

12. Calorimetric mass flowmeter according to claim 8, wherein the switching device has at least one comparator and a switch, wherein the at least one comparator influences the switch, and wherein, in a switched state, the switch disconnects a connection between the voltage source and the electronic component.

13. Calorimetric mass flowmeter according to claim 12, wherein the switch is a thyristor.

14. Calorimetric mass flowmeter according to claim 12, wherein the bridge transverse voltage of the Wheatstone bridge is present at two inputs of the at least one comparator.

* * * * *